June 21, 1966 　　J. H. BYERS　　3,256,920
METHOD FOR INCREASING THE TRACTION OF VEHICLE TIRES WITH
ICY ROAD SURFACES
Filed Aug. 14, 1964

INVENTOR
J. Harold Byers

United States Patent Office 3,256,920
Patented June 21, 1966

3,256,920
METHOD FOR INCREASING THE TRACTION OF VEHICLE TIRES WITH ICY ROAD SURFACES
J. Harold Byers, 4627 Verplanck Place NW., Washington, D.C.
Filed Aug. 14, 1964, Ser. No. 389,700
17 Claims. (Cl. 152—208)

The present invention relates to method and means for increasing the traction of operating surfaces in frictional contact with ice and icy surfaces, and particularly relates to reducing the skidding of vehicle tires on ice-covered and snow-covered roadways.

This application is a continuation-in-part of my application Ser. No. 366,143, filed May 8, 1964.

The heavy toll of accidents on the slippery surfaces of streets and highways during the winter season has long been a matter of serious public concern. Various types of tires, tractional devices, and even automotive mechanisms have been proposed and tried. A great deal of research has been carried out by numerous organizations in studying the problem. But to date no satisfactory solution appears to have been achieved.

It is well known that brake effectiveness on ice is dependent upon the prevailing temperature conditions. In a paper by Professor A. H. Easton, presented January 12, 1961, before the Highway Research Board, it was stated that the sliding coefficient of friction on ice ranges from 0.05 at 32° F. to 0.17 at −20° F. In terms of braking distance, these show a wide range of variation, the stopping distance being relatively short on dry or cold ice, and realtively greater as the melting point of ice is reached.

It is an object of the present invention to prevent the skidding of vehicle tires, particularly automobile tires, on icy surfaces while driving.

It is a further object of the present invention to achieve the aforesaid purpose without relying exclusively, or to any extent, upon mechanical devices such as tire chains, tread compositions and tread formation patterns.

A further object of the present invention is the provision of a means for preventing and/or reducing skidding of tires on icy surfaces, without modifying the ordinary automobile operating techniques to any appreciable extent.

A further object of the present invention is to provide a means of increasing the traction of the tires by means which may be put into effect by the driver of the car from his position behind the wheel, and without interference of his trip or normal driving pattern.

With these objectives in mind, it is the province of the present invention to effect refrigeration, cooling or chilling of the surface of a tire otherwise subject to slippage in contact with an icy surface, to a temperature below that normally prevailing.

This cooling of the outer tire surface may be accomplished in any way whatsoever subject to practical considerations. Preferably the cooling of the tire surface is effected by bringing into contact with the tire during its normal rotation a cooling gas, liquid or solid. The latter may be applied as by direct contact of the tire surface with a body having a low temperature, such as frozen carbon dioxide or Dry Ice. Or the tire surface may be subjected to a spray of liquid producing a degree of coldness (heat of evaporation) upon its expansion and vaporization, such as ethyl ether. Or a jet of gas such as air, subjected to compression, permitted to cool to atmospheric temperature, and then directed against the tire surface, may be employed to achieve cooling by gas expansion. Many methods of cooling tires while the vehicle is in motion, have been suggested. In this connection the following patents may be noted: No. 953,299, No. 1,780,306, No. 1,956,739, No. 2,119,204, No. 2,443,328 and No. 3,077,743. However none of these in any way suggests the cooling of a tire surface to a temperature low enough or with the purpose in mind, of reducing or preventing skidding of the tire on an icy surface. On the contrary, each of the foregoing patents is directed to an entirely different object, and in the main, simply to the prevention of overheating of the tire on the road.

In contrast, in the practice of the present invention it is necessary to cool the entire surface rather substantially, and the present invention for the most part is concerned with winter driving conditions rather than those which prevail under circumstances where the tire would be subject to overheating.

Within the purview of the present invention the tire surface necessarily must be cooled to a temperature not substantially higher than the freezing point of water, and practical results would require cooling to appreciably lower temperatures. If it were desired to employ the present invention on roads that were slippery merely by reason of a film of water, the cooling of the tire surface to a temperature of or below 32° F. could, of course, have an appreciable effect, as will hereinafter appear; however it is not contemplated that the major use of the present invention will be found other than during winter conditions.

The following underlying theory, not binding on applicant, is provided and may be of assistance in a better understanding of the present invention.

It is known that the lowering of the coefficient of friction between a smooth surface of a solid body, such as an automobile tire and a body of ice, is caused essentially by the formation of a thin layer of water interposed therebetween. When a solid body is brought into pressure contact with a body of ice, the pressure lowers the real freezing point of the ice, and accordingly, the latter which at ordinary pressures is a solid at 32° F., is transformed into water. This accounts for the slipperiness of ice when the ambient temperature is about 32° F., and the lesser degree of slipperiness at lower temperatures. When the temperature is such that the pressure of the tire causes no liquefaction at all, the ice remains a dry solid, and a high coefficient of friction between it and the tire surface prevails.

Whereas the invention is pointed out with particularly in the subjoined claims, in order to provide a disclosure that will enable those skilled in the art to most readily practice the invention, the following description and illustrations of the invention are provided.

Figure 9:
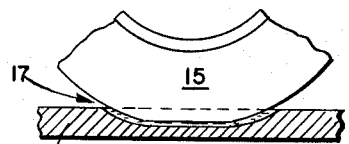
FIG. 9 illustrates the formation of a water film between the tire and the ice.

In detail, at ordinary atmospheric outdoor winter temperatures, frequently the surface of the road is covered with ice. It will be understood that the term "ice" as herein used refers to frozen water in the forms in which it occurs under winter weather conditions of snow, glaze ice, and the like. In FIG. 9 it is assumed that the ice 11, is comparatively continuous and smooth surfaced, although in actuality the ice may be irregularly distributed, or in the form of particles, as well understood. In this figure the condition is shown which obtains in the absence of the present invention, a film of water 17, having formed at the tire-ice interface. The drawing is schematic, the thickness of the water film being exaggerated for better illustration.

The tire 15 is an ordinary automobile tire which is in process of rolling on the surface of the road under forces due to the weight of the vehicle. As is well known, the repeated strain and flexing action on each part of the tire as it rolls into contact with the road surface and then away therefrom contributes to the development of a certain amount of heat tending to raise the temperature of the tire somewhat above that of the atmosphere. The temperature of the tire thus may be higher than that of the ice, and if so, this higher temperature may have some tendency to melt the ice when it comes in contact therewith.

Especially, however, the slipperiness of ice is attributable to the effect of pressure on the ice. Under ordinary winter conditions especially in temperate latitudes, the pressure of the tire on the ice surface may be and usually is sufficient to cause the ice to melt at the interface forming a film of liquid water as at 17.

Figure 1:
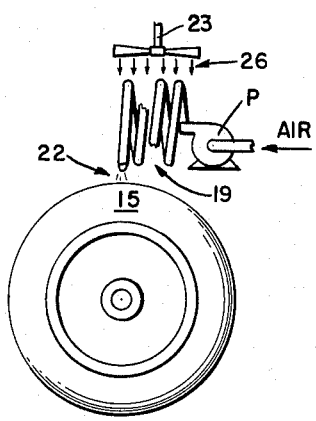
FIG. 1 illustrates cooling of an automobile tire by directing an air blast thereon.

Various methods are suitable for the purpose of cooling the surface of the tire below a temperature sufficient to avoid formation of the liquid water film. In FIG. 1, there is schematically represented a method and means which involves the projection of a jet of cold air on the surface of the tire. In this embodiment air is drawn in as indicated by the arrow and compressed and delivered by pump P into coil 19. The compressed air in coil 19 initially will be raised in temperature above the temperature of the indrawn air. In this case it may be taken that the air is drawn from the outside and initially is at the prevailing temperature. The heated air in coil 19, while confined in the coil, is cooled in conventional manner, as by a forced draft blown over coil 19 by fan 23. Or if desired, the coil 19 may be mounted on the body of the car in such a position as to be exposed to the surrounding air and will be cooled by its movement therethrough.

After the air in coil 19 has cooled down to a temperature approaching atmospheric, it is released from exit orifice 22 whereupon it expands and thereby cools to lower than atmospheric temperature. At this point it is projected upon the surface of tire 15 thereby cooling the latter. Developments and modifications of this means will be readily apparent to those skilled in the art. In FIG. 1, the dimensions are not proportionate, coil 19 or equivalent compression chamber essentially having sufficient volume capacity to contain a sizable amount of compressed air.

Figure 2:
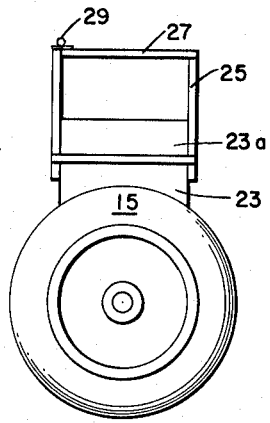
FIG. 2 illustrates a method whereby the surface of the tire is brought into direct sliding contact with Dry Ice.

In FIG. 2, the tire 15 is cooled by direct contact with a block of Dry Ice 23. This bears and slides on the surface of tire 15. Magazine 25 holds additional blocks of Dry Ice 23a, and it may in part be formed of insulating material (not illustrated) if desired. Access may be provided in any desired way as by hinged top 27 which can be opened to insert additional blocks of Dry Ice.

Figure 3:
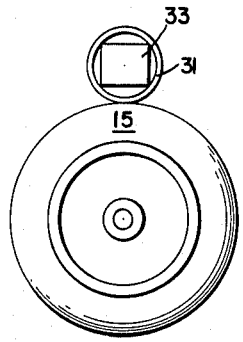
FIG. 3 illustrates a further method whereby the surface of the tire is brought into direct rolling contact with a cold body.

In FIG. 3, a cylinder or roll 31 which is at comparatively low temperature rolls in contact with the surface of tire 15. This roll may be cooled in any desired way, as by a block of Dry Ice 33 contained therein.

Figure 4:
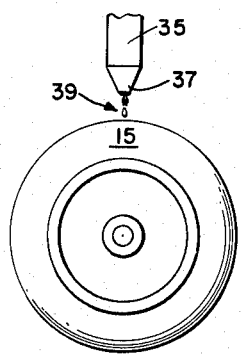
FIG. 4 illustrates an additional method whereby the tire is cooled by drippage of cooling liquid thereon.

FIG. 4 illustrates an embodiment in which the tire surface is cooled by dripping thereon a liquid which is at a comparatively low temperature. The liquid is supplied by means of a conduit 35 having a nozzle 37 from which is delivered the cooling liquid in the form of drops 39. The cooling in this embodiment may be effected solely by the low temperature of the supplied liquid, or by evaporative cooling occasioned by the use of a liquid having a low temperature of vaporization, or by a combination of these effects.

The drip method of FIG. 4, moreover, lends itself to the additional possibility of supplying to the tire surface a substance dissolved or dispersed in the liquid which upon being deposited on the tire surface can act mechanically to increase the effect of the sensible traction of the tire with the ice surface.

Figure 5:
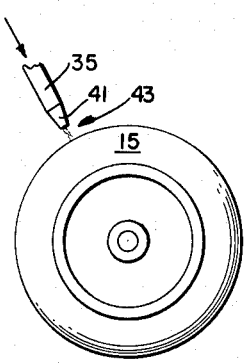
FIG. 5 illustrates an embodiment whereby a jet of cooling liquid is projected on the tire surface.

FIG. 5 shows a modification whereby a jet 43 of liquid may be supplied to the tire surface. This method accomplishes essentially the functions of the embodiment illustrated in FIG. 4, and uses fundamentally the same means only supplying the liquid under greater pressure or with a modified type of nozzle 41 adapted to deliver the liquid in the form of a jet.

Figure 6:
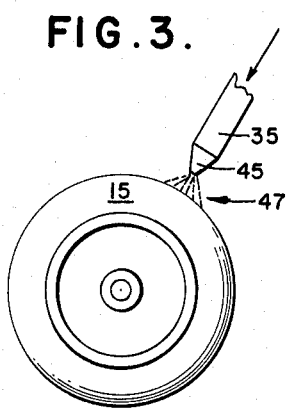
FIG. 6 illustrates a method involving the use of a spray of cooling liquid.

In FIG. 6 there is provided a means which delivers the coolant liquid in the form of a spray 47. This likewise can be accomplished by conventional changes in the nozzle 45, and by regulating the pressure of the liquid in conduit 35 to the proper degree.

Figure 7:
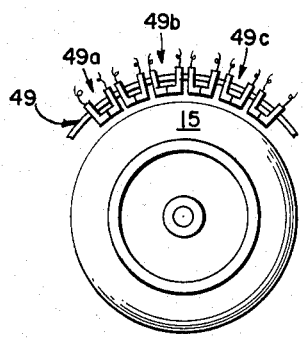
FIG. 7 illustrates the cooling of a tire by radiation of the heat thereof to cooler bodies not in contact with the tire.

In FIG. 7, tire 15 is cooled by radiation of the heat thereof to a body 49 spaced therefrom and maintained at a lower temperature than that of the tire surface. As illustrated body 49 comprises a series of units 49a, 49b, 49c up to any suitable number, each unit being the cold junction of a thermocouple through which an electric current is passed, the low temperature of the junction being due to the Peltier effect.

Figure 8:
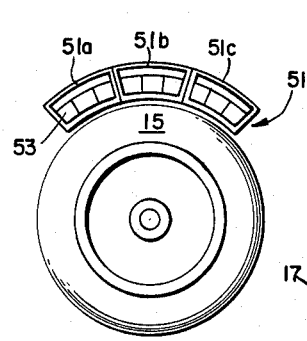
FIG. 8 is an illustration of a further method of cooling by means of radiation to bodies which are at lower temperature than the tire surface.

FIG. 8 illustrates an alternate method of lowering the temperature of the surface of tire 15 by means of radiation to a colder body 51 which may be composed of units 51a, 51b, 51c up to any number, and wherein the colder body is maintained at a subatmospheric temperature by inclusions of Dry Ice 53.

I claim:

1. Method of increasing the traction between the tread surface of a vehicle tire and an icy road surface with which said tire tread is in contact, which comprises cooling the tread surface of the tire to a temperature below the prevailing ambient air temperature and to an extent sufficient to increase said traction.

2. Method of increasing the traction between the tread surface of a tire and an icy road surface with which said tire tread is in contact, which comprises cooling the outer surface of the tire below the temperature of water film formation between said tire and said icy surfaces.

3. The method according to claim 1, wherein said cooling is effected by means of an externally applied agency.

4. Method according to claim 1, wherein said cooling is effected by applying to the surface of the tire a body of Dry Ice.

5. Method according to claim 1, wherein said cooling is effected by means of a jet of cooled gas.

6. Method according to claim 1, wherein said cooling is effected by a spray of cooling liquid.

7. Method according to claim 1, wherein said cooling is effected by a jet of cooling liquid.

8. Method according to claim 1, wherein said cooling is effected by contact of the surface of said tire with a solid body at a temperature lower than the surface of said tire.

9. Method according to claim 1, wherein said cooling is effected by proximity of the surface of the tire to a body at a temperature lower than the surface of said tire.

10. Method according to claim 9, wherein the body is maintained at a temperature lower than the surface of said tire.

11. Method according to claim 1, wherein said cooling is effected by applying to the surface of the tire a body in rolling contact therewith, said body being at a temperature lower than that normal for the tire surface in the absence of said body.

12. Method according to claim 1, wherein said cooling is effected at least in part by conduction.

13. Method according to claim 1, wherein said cooling is effected at least in part by radiation.

14. Method according to claim 1, wherein said cooling is effected at least in part by convection.

15. Method according to claim 1, wherein said cooling is effected at least in part by evaporation.

16. Method according to claim 1, wherein said cooling is effected at least in part by gas expansion.

17. Method according to claim 1, wherein said cooling is effected by the Peltier effect.

References Cited by the Examiner

UNITED STATES PATENTS 3,077,743  2/1963  Castro et al. _____ 180—1 X

ARTHUR L. LA POINT, *Primary Examiner.*

C. W. HAEFELE, *Assistant Examiner.*

UNITED STATES PATENT OFFICE
CERTIFICATE OF CORRECTION

Patent No. 3,256,920            June 21, 1966

J. Harold Byers

It is certified that error appears in the above identified patent and that said Letters Patent are hereby corrected as shown below:

Column 1, line 32, "realtively" should read -- relatively --; line 63, "Dry Ice" should read -- dry ice --. Column 2, line 46, "particularly" should read -- particularity --. Column 3, lines 63, 65, 68, 69 and 73, and column 4, line 57, "Dry Ice" each occurrence, should read -- dry ice --.

Signed and sealed this 2nd day of December 1969.

(SEAL)
Attest:

Edward M. Fletcher, Jr.            WILLIAM E. SCHUYLER, JR
Attesting Officer            Commissioner of Patents